June 12, 1934.   A. BARDELLO   1,962,888
DROP FORGED ATTACHING CLIP
Filed March 30, 1933
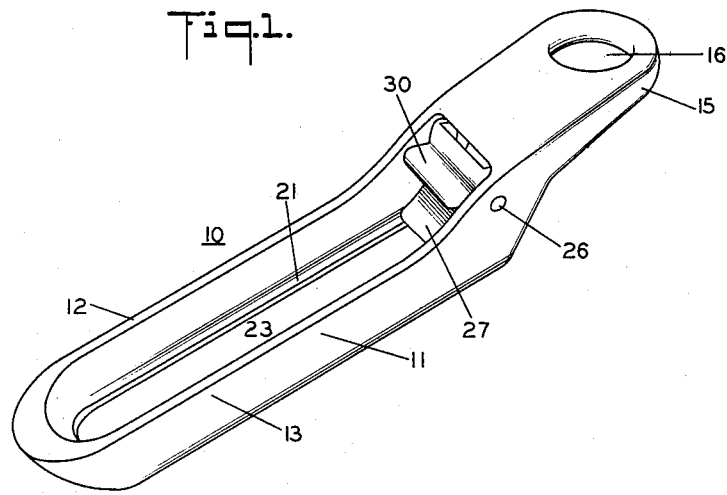
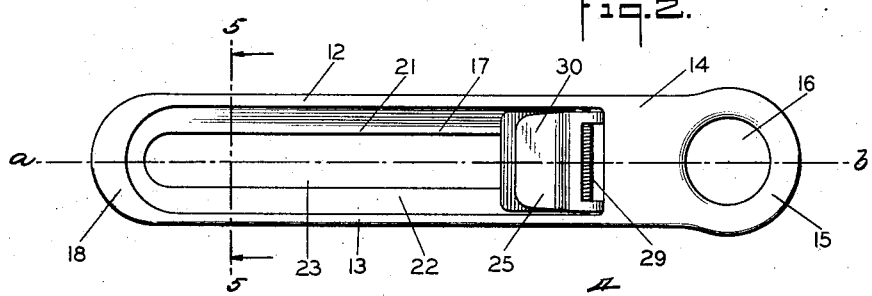
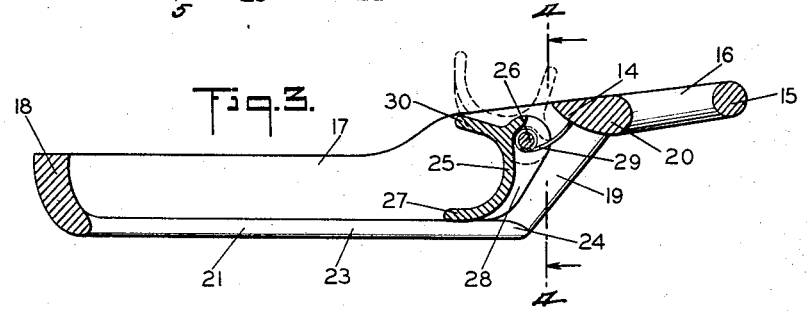
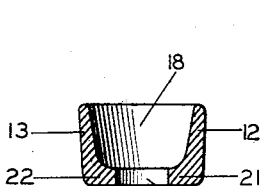
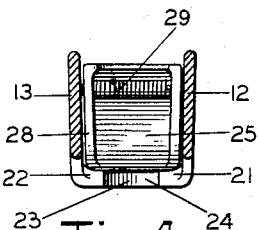
INVENTOR
ANTONIO BARDELLO
BY
Warren S. Orton
ATTORNEY Patented June 12, 1934

1,962,888

UNITED STATES PATENT OFFICE 1,962,888

DROP FORGED ATTACHING CLIP

Antonio Bardello, Richmond Hill, N. Y.

Application March 30, 1933, Serial No. 663,438

7 Claims. (Cl. 24—224)

The invention relates to an attaching clip for use in connection with window washers' harness of the type usually designed to receive and retain the fixed securing lugs of an anchor supported from the building structure adjacent a window.

Devices of this character as heretofore known have been open to the objection that they contain projecting parts which are quite apt to catch in the clothing or other paraphernalia of the operator with resulting liability to accident and this is particularly true of that portion of the conventional clip which comprises the pivoted keepers or fastening bolts employed in such structures to lock the lugs in position in the clip. It is desirable, of course, in such constructions to provide a form of keeper which can be readily moved into unlocked position and thus permit the ready separation of the clips from the lugs when desired, and this has heretofore resulted in a form of keeper which has readily engageable projecting parts. The objection to this construction however, is that the projecting parts are quite liable to be caught accidentally and the clip unlocked with resulting liability of becoming accidentally displaced from the lug or lugs with disastrous results.

Accordingly, the primary object of the invention is to provide a simple form of attaching clip which will feature the desirable ease of access to the locking keeper and which at the same time will shroud and so protect the keeper as to minimize if not entirely avoid possibility of accidental unlatching of the clip.

Broadly this phase of the invention is attained by providing a channel for receiving the lugs and which channel will be of conventional and approved design but which will be constructed and dimensioned so as to entirely contain the keeper which closes one end of the slot in such way that the operator by inserting his finger in the slot can readily and easily release the keeper but the sides of the clip are so designed to lap and thus provide a shroud for the opposite sides of the keeper and thus protect it from accidentally moving into its released position.

Certain governmental authorities have imposed regulations on the construction of clips of this character, it being a recent requirement of the Department of Labor of the State of New York that these clips possess certain structural requirements as to strength, material and the like, and one of such requirements is that the clips be made for the most part of drop forgings. This requires certain refinements in operations in constructing the articles especially when the clips must be made cheaply, such for instance as the necessity of withdrawing forming cores from the forged parts.

Accordingly another object of the invention is to provide a form of clip which will meet the building regulation requirements and which at the same time can be constructed economically and which will provide maximum structural strength with the least use of material.

Accordingly the present invention features a peculiarity in structural design which will permit in the formation of the main or body portion the forging therein of an approved form of channel, and which channel can be formed in such way as will permit the withdrawal therefrom in a straight line of suitable form of core used in the forging operation and there is also featured a construction which incidentally will provide a rugged bridge located adjacent the junction of the channel portion and a fastening eye at which part of the clip structural strength is particularly required.

Various other objects and advantages of the invention will be in part obvious from an inspection of the accompanying drawing, and in part will be more fully set forth in the particular description of one form of mechanism embodying the invention, and the invention also consists in certain new and novel features of construction and combination of parts hereinafter set forth and claimed.

In the accompanying drawing

Fig. 1 is a view in perspective of a preferred embodiment of the invention;

Fig. 2 is a plan view looking down on the front side or open channel thereof;

Fig. 3 is a longitudinal sectional view taken on the line $a$—$b$ of Fig. 2 with the keeper shown in full lines in its normal closed position and shown in ghost outline in its open position; and Figs. 4 and 5 are transverse sectional views taken respectively on the lines 4—4 of Fig. 3 and 5—5 of Fig. 2 in each instance looking in the direction indicated by the arrows.

There is shown a drop forge attaching clip 10 formed of an elongated body 11 having substantially uniform thickness and width and formed for the most part of sides 12 and 13 which are symmetrical with reference to the longitudinally extending plane of reference indicated by the line $a$—$b$. The body portion increases slightly in thickness as it approaches one end as shown in Fig. 3 and from this end there is an extension 14 projecting above the plane of the top of the body and said extension reducing its thickness from its engagement with the body portion towards its free end 15. The free end 15 is substantially flat and provided with an eye 16. The clip is provided with a longitudinally extending channel 17 spaced from the end opposite the eye to form a rounded end or hook 18. The channel extends from such closed end or hook 18, longitudinally along the axis of reference, through the body 11 and out through the enlarged portion of the extension to form a straight core with an open end 19. The open end is overlapped by the portion of the extension between the open end of the channel and the eye by a reinforcing bridge 20 which is of greater thickness than the free end 15 and is designed to give massive structural strength to this portion of the clip. The channel is wide open on one side that is the upper side as shown in Fig. 3, and is defined on its opposite side bottom Fig. 3, by a pair of spaced apart flanges 21 and 22 which coact with the sides 12 and 13 to form the sides as members L-shaped in cross section as shown in Fig. 5. From this construction it is noted that the flanges are spaced apart so as to form therebetween a longitudinally extending slot 23 progressively widening towards its open end as shown in Fig. 5, opened at its end 24 beneath the extension 14. It is particularly noted that the channel is entirely open between the sides 12 and 13 and from the hooked end to the keeper 25 hereinafter described, so that in effect the entire portion of the channel is exposed and is designed to have a width sufficient to accommodate the finger or thumb of the operator as it is moved along the same to engage the keeper. The construction of the channel with its wide open end permits the longitudinal withdrawal of the forming cores or dies in a straight line movement thus tending to cheapen the cost of manufacture while complying with the local regulations that these clips must be of drop forge construction.

A pivot pin 26 extends across the end of the channel adjacent the bridge, has its opposite ends soldered or riveted in the sides 12 and 13 and located adjacent the open side of the channel and spaced from the flanges 21 and 22. The keeper 25 is of somewhat U-shaped construction with one leg longer than the other and pivotally mounted adjacent the crotch portion on the pin 26. The long leg 27 of the keeper is flanged on its outer side and the pin is passed through the flanges 28. A coiled spring 29 is wrapped about the pin between the flanges 28, bears at one end against the keeper and at the opposite end against the bridge and acts normally on the keeper to maintain the long leg 27 with its free curved end in bearing engagement with the flanges 21 and 22. The parts are so designed that the short leg 30 of the keeper forms a single engaging ledge which extends across the channel and is disposed so that the operator as he draws his finger or thumb along the channel guided between the sides thereof the finger engages this ledge in position so as to quickly rotate the keeper on its pin and remove the long leg 27 from its normal position closing the adjacent end of the slot as shown in full lines in Fig. 3 into its open position shown in dash lines thereby opening the end 24 of the channel and permitting the ready withdrawal of the clip from the attaching lug or lugs.

It is a feature of this disclosure that while the finger engaging ledge 30 forming part of the keeper is readily accessible adjacent the outer portion of the channel, at the same time the keeper as a whole is contained within or substantially contained within the outlines of the clip as a whole. There is thus avoided any projecting parts, either fixed to the body of the clip or forming a part of the movable keeper. Any clothing or other part of the workman's paraphernalia is simply guided or permitted to slip idly along the outer sides of the clip and there is minimized, if not entirely avoided, any possibility of the clip catching in his clothing or of accidentally moving the keeper into its unlocked position. The construction disclosed also features the elimination of angled parts which tend to cause the clip to be caught in the workman's clothing, and in general there is provided a smooth, rounded construction which can be easily manufactured and which in its feature of avoiding catching in extraneous objects tends to minimize danger incidental to its use.

I claim:

1. A drop forged attaching clip for window-washers' harness comprising an elongated one-piece body of substantially uniform thickness and width and having sides symmetrical with reference to a longitudinally extending plane of reference, said clip including an extension projecting integrally from one end of the body and projecting laterally to one side of the body, said extension reducing in thickness from its engagement with the body portion towards its free end, the end portion of the extension forming said free end being substantially flat and provided with an element of a fastening means, said clip provided with a channel spaced from the end opposite the said fastening means to form a hook and extending longitudinally from said hook to form a straight open end core containing recess, the portion of the extension between the open end of the channel and the fastening means forming a rugged reinforcing bridge, and said channel defined on one side by a pair of spaced apart flanges extending from the hook end and forming therebetween a longitudinally extending slot open at its end beneath the extension and bridge and said channel being entirely open on the opposite side between the hook forming end and the part of the extension provided with the fastening means and forming the bridge, and the portions on opposite sides of said channel forming sides L-shaped in cross section, a pivot pin extending across one end of the channel adjacent the bridge, a U-shaped keeper pivoted adjacent its crotch portions to the pin and a spring coiled about the pin and acting normally to maintain the keeper in position extending across the open end of the channel and with its free end engaging the flanges, said keeper normally disposed with substantially all parts thereof contained in the channel to minimize externally extending parts.

2. A drop forged attaching clip for window washers' harness comprising an elongated one-piece body provided at one end with an extension having an eye, said body provided with a longitudinal channel open at the end adjacent the extension, said body provided with sides substantially L-shaped in cross section and forming a pair of flanges projecting towards each other and defining one side of the channel, and said channel being entirely open on the side opposite the flanges, a pivot pin extending between the sides at the end of the channel adjacent the extension, said pin being located adjacent the open side of the channel and spaced from said flanges, a keeper approximately U-shaped in cross section pivotally mounted adjacent its crotch portion on the pin and normally disposed in position closing the end of the channel, and located entirely within the outlines of the channel to avoid externally projecting parts, a spring coiled about the pin and acting on the keeper to maintain one side thereof in engagement with the flanges, and the other side of the keeper providing an exposed finger piece by means of which the keeper can be swung into open position against the tension of said spring.

3. A drop forged attaching clip for window washers' harness comprising an elongated one-piece body provided at one end with an extension having an eye, said body provided with a longitudinal channel open at the end adjacent the extension, said body provided with sides substantially L-shaped in cross section and forming a pair of flanges defining one side of the channel, and said channel being entirely open on the side opposite the flanges, a pivot pin extending between the sides at the end of the channel adjacent the extension, said pin being located adjacent the open side of the channel and spaced from said flanges, a keeper approximately U-shaped in cross section pivotally mounted adjacent its crotch portion on the pin and having a leg normally disposed in position closing the end of the channel, and having a leg facing the channel and forming a finger piece, both legs located entirely within the outlines of the channel to avoid externally projecting parts, a spring coiled about the pin and acting on the keeper to maintain the first-named leg thereof in engagement with the flanges and said spring being disposed in an out of the way position within the outlines of the body.

4. A straight elongated attaching clip for window washers' harness comprising a one-piece member having a channelled body and an eyed extension from one end, a keeper for closing the end of the channel adjacent the extension, said keeper being contained within the outlines of the body and said clip as a whole being outlined mainly by rounded surfaces and being free of external projections or angled parts which might become caught in external objects.

5. In a clip of the class described, the combination of a body including spaced apart parallel sides forming therebetween an elongated channel, parallel flanges integral with the sides and defining one side of the channel and the opposite side being wide open to permit the intrusion into the channel of an operator's thumb or finger, a keeper hinged between the spaced apart sides and contained within the outlines of the body, said keeper being substantially U-shaped, having its concaved crotch portion facing the channel with one leg acting normally to close one end of the channel and the other leg providing a controlling finger-piece disposed in the path of movement of the operator's finger as it is guided along the channel by the sides thereof whereby the keeper can be moved into open position by the operator's thumb or finger as it is guided into engagement therewith along said flanges and between the side walls forming the channel.

6. An attaching clip for window washers' harness comprising a one-piece member including two parallel sides forming a channel therebetween with an open side and a bridge piece connecting the sides at one end of the channel, a pin extending across the channel adjacent the bridge, a keeper pivotally mounted on the pin and normally disposed within the space between the parallel sides, said keeper being of U-shaped construction with its concaved side facing into the channel and having one leg normally extending across the channel at its open side to form a finger engaging element for rotating the keeper.

7. An attaching clip for window washers' harness comprising a one-piece member including two parallel sides forming a channel therebetween with an open side and a bridge piece connecting the sides at one end of the channel, a pin extending across the channel adjacent the bridge, a keeper pivotally mounted on the pin and normally disposed within the space between the parallel sides, said keeper being of U-shaped construction with its concaved side facing into the channel and having one leg normally extending across the channel at its open side to form a finger engaging element for rotating the keeper, and said keeper provided on its convexed side with a pair of flanges through which the pivot pin extends, and a spring coiled about the pin, between said flanges, and disposed within the end of the channel between the keeper and bridge and having one end engaging the bridge.

ANTONIO BARDELLO.